United States Patent [19]

Schwartz

[11] 3,904,456

[45] Sept. 9, 1975

[54] METHOD FOR INHIBITING TRANSMISSION OF AIRBORNE NOISE

[75] Inventor: Herwig Josef Schwartz, Schwetzingen, Germany

[73] Assignee: Teroson Werke, Heidelberg, Germany

[22] Filed: Oct. 23, 1973

[21] Appl. No.: 408,311

Related U.S. Application Data

[63] Continuation-in-part of Ser. No. 321,609, Jan. 8, 1973, abandoned, which is a continuation of Ser. No. 11,942, Feb. 17, 1970, abandoned.

[52] U.S. Cl. .................. 156/71; 180/90; 181/33 G; 181/33 GA; 244/1 N; 252/62; 260/41 R; 296/70; 428/461
[51] Int. Cl.² ...................... E04B 1/99; E04B 1/74
[58] Field of Search ......... 244/1 N; 296/70; 180/90; 156/71, 281; 161/162, 216, 97; 181/33 G, 33 GA; 260/41 R; 252/62

[56] References Cited
UNITED STATES PATENTS

| | | | |
|---|---|---|---|
| 3,203,936 | 8/1965 | Breslow et al. | 260/87.3 X |
| 3,203,937 | 8/1965 | Breslow et al. | 260/87.3 X |
| 3,424,270 | 1/1969 | Hartman et al. | 156/281 X |
| 3,509,963 | 5/1970 | Deplante | 181/33 G |
| 3,640,830 | 2/1972 | Oberst et al. | 181/33 G |

FOREIGN PATENTS OR APPLICATIONS

884,573   12/1961   United Kingdom

*Primary Examiner*—Edward G. Whitby
*Attorney, Agent, or Firm*—William L. Baker; C. E. Parker

[57] ABSTRACT

It has been found that transmission of airborne noise can be inhibited by interposing in the air space between the noise source and the location to be insulated a thin, dense, normally self supporting film or sheet composed essentially of certain ethylene-vinyl acetate copolymers and from about 60 to about 90 percent by weight of inorganic filler materials effective to produce an overall density greater than at least 2 grams per cubic centimeter. The average vinyl acetate content of the ethylene-vinyl acetate copolymer, preferably a mixture or blend of copolymers, must be in the range of from about 10 to about 42 percent by weight of the copolymer ingredient. The normally self-supporting film or sheet gives a level of sound blocking greater than that expected from calculations according to the Mass Action Law (sometimes referred to as Berger's Law.)

7 Claims, 1 Drawing Figure

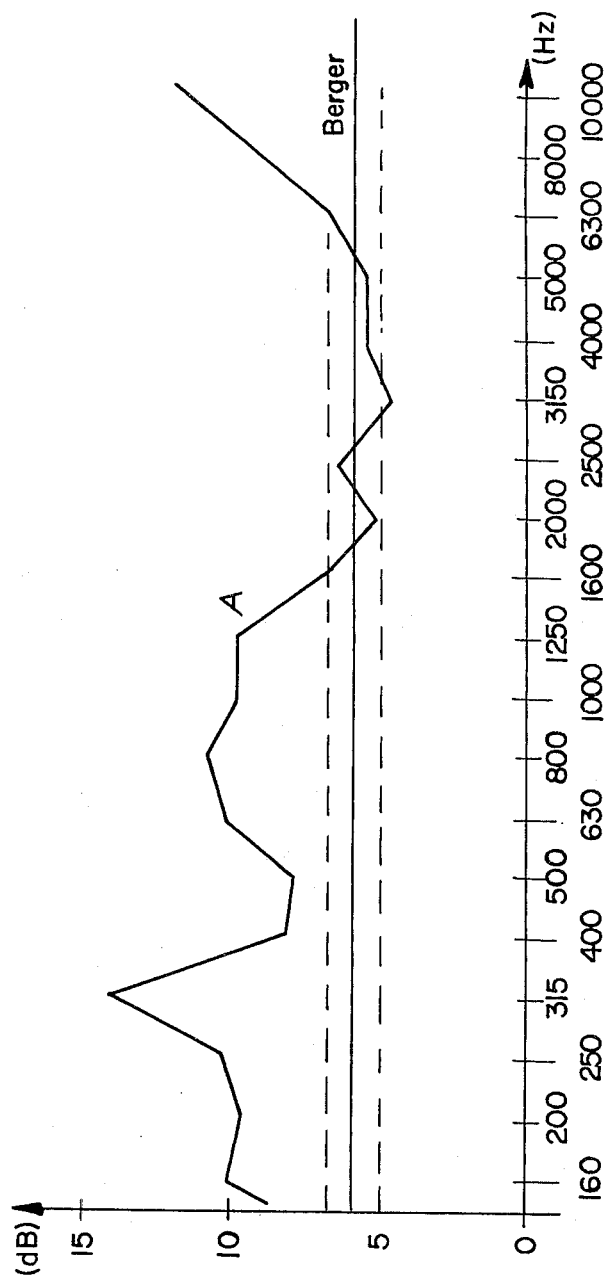

METHOD FOR INHIBITING TRANSMISSION OF AIRBORNE NOISE

This application is a continuation-in-part of U.S. application Ser. No. 321,609, filed Jan. 8, 1973 now abandoned which in turn is a continuation of U.S. application Ser. No. 11,942, filed Feb. 17, 1970 now abandoned.

This invention relates to a method for inhibiting transmission of airborne noise through the use of a thin, dense, noise attenuation film or sheet interposed in the air space between the noise source and the location to be insulated, e.g., the location of a potential hearer. The film or sheet may be in the form of a free-standing dimensionally stable article in the air space or may be attached to a poor sound blocking substrate already in the air space in order to inhibit transmission of airborne sound which is incident to said substrate.

In our mechanized and industrial society, there is an ever increasing level of noise (i.e., sound in the normally audible range of frequency) present in the home, in transportation vehicles, in manufacturing plants and in office buildings. Generally, noise problems can be categorized into two different types. There is airborne noise, which may emanate from a pice of machinery such as automobile engines, motors, industrial machines or office equipment and then travels through the air via a compression and rarifaction of the air. In this type of noise problem the noise source can be separated from the hearer by a barrier, for example a separating wall in a room or between compartments in a transportation vehicle such as an auto, but this noise source via the medium of the air can and frequently does cause the barrier to vibrate and emit noise which is still propagated to the hearer. An illustration of this type of noise transmission is a sound generating device in one enclosed room causing the air in that room to transfer energy to the walls of the room which then sympathetically vibrate and thereby transmit noise to an adjoining room. The second type of noise problem is structure borne noise which is transmitted through various solid substrates, one to another, thereby exciting each of these substrates to emit noise. This type of noise problem has also been termed "drumming." In this type of noise generation and transmission no gaseous medium (such as air) is involved in the transfer of the noise energy from one substrate to another. This type of noise is generated by various types of industrial machinery such as motors, ball mills, grinders, and so on and transmitted via connected conduits, supports and the like to other locations. Various types of spring and dashpot type mountings have been used to insulate this type of noise. As an illustration, in an automobile the rubber or polymeric engine mounts, transmission mounts, rear axle mounts, and so on, provide a means of inhibiting the transmission of sound from one metal part to another and thereby throughout the vehicle. It is also known to apply various coatings ("anti-drumming" compositions) to noise generating machinery in order to inhibit ("damp") generation of structure borne noise. For example, Gladding et al. U.S. Pat. No. 3,489,242 and BASF British Pat. No. 884,573 each disclose that one method of inhibiting generation of structure borne noise is to coat the noise source with a visco-elastic material containing up to 90 percent by weight of an inorganic filler. Useful visco-elastic materials disclosed include ethylene-vinyl acetate copolymers such as those of British Pat. No. 884,573 containing 55–95 weight percent vinyl acetate. Various inorganic filler materials may be used, with U.S Pat. No. 3,489,242 preferring to use filler materials having a specific gravity of at least 2.5. As emphasized by both of these patents, the glass transition temperature of the visco-elastic binder material must be within about 15° Centigrade of the use temperature of the structures to which the coatings are applied. That is, in order for one of these coating materials to effectively damp( inhibit generation of) structure borne noise, it is necessary that the transition of the binder from the visco-elastic state to a glass state is in the range of the temperature at which the structure will be predominantly used.

At first blush it would be thought that a filled visco-elastic anti-drumming material which is effective in damping structure borne sound, would also be effective in attenuating airborne sound. However, it has been found that this is not the case, but that the best materials for attenuating airborne sound are those in which the binder has a very low glass transition temperature and particularly where the glass transition temperature is significantly below the temperature at which the sound blocking material is to be used. This is different from anti-drumming compositions where the glass transition temperature of the visco-elastic binder must be in the range of the average temperature of the structure's use. It is only after further thought and experimentation that it is seen there are different problems present in attempting to inhibit generation of sound from a vibrating source such as a metal sheet or other substrate and in attempting to inhibit transmission of airborne sound coming into contact with a similar metal sheet or other substrate. In one instance, a vibrating metal sheet radiates airborne sound. By applying a vibration damping material, the amplitude of the vibration is reduced and, thus, the radiated energy reduced. The energy loss is caused by conversion of vibrational energy into heat by internal friction. If this metal sheet is exposed to incident airborne sound the sound will be transmitted through the sheet, reduced only by the loss caused by the inertia of this metal sheet. Therefore, in order to reduce the transmission of sound through this sheet, the mass of the sheet must be increased. This efffect of adding mass, however, is only fully effective if the stiffness of the sheet is not further increased. Accordingly, materials used for the two purposes must differ in a very significant way. In damping (inhibiting generation of) structure-borne noise, the polymeric material must have a glass transition temperature very close to the temperature of the substrate, and the filler is preferably a light-weight material having a plate-like structure, such as vermiculite. In attenuating( inhibiting transmission of) airborne noise, it is essential that the glass transition temperature of the polymeric material be considerably below the average ambient temperature of the use of the device, and as a particular embodiment that it be at least about 30°C below the average ambient use temperature of the device, and a heavy filler must be used. It is therefore evident that a visco-elastic material which is effective as an anti-drumming film would not be effective as an airborne sound attenuating film. The required polymeric binder characteristics are different and no one material will be effective for both uses.

The use of heavy fillers, especially barium sulfate, in sound blocking materials employed as a core layer in laminated structures has been disclosed by U.S. Pat. No. 3424270 to Hartman et al. This patent teaches the use of highly plasticized, curable polymeric binders, including in passing (Col. 2, lines 56–57) a solitary mention of "polyethylenepolyvinyl acetate copolymers". BASF Technical Leaflet M2196d discloses utility of barium sulfate filled ethylene-vinyl acetate copolymer "Lupolen V3510K" as an X-ray contrast sheet or for radiation protection. No mention is made of noise inhibition or prevention.

It is an object of this invention to provide a method for inhibiting transmission of airborne noise. This object and other objects of this invention are the result of the discovery that transmission of airborne noise is most effectively inhibited by interposing in the air space between the noise source and the location to be insulated a dense filled film or sheet based upon a polymeric binder material which has a glass transition temperature at least 30° Centigrade below the average ambient use temperature. This is significantly different from the damping of structure borne sound (i.e., drumming) wherein it is required that the binder be a viscoelastic material having a glass transition temperature within about 15° Centigrade of the structure's average ambient use temperature.

FIG. 1 is a graph showing the inhibition of airborne noise in accordance with the method of this invention and illustrating the improvement over that predicted from calculation according to the Mass Action Law (Berger's Law). The Mass Action Law is explained, for example in Kurtze "Physik und Technik der Larmbekampfung" Verlag G. Braun Karlsruhe (1964) pp 92 et seq (especially p. 93 for formula). Berger's Law is given, e.g., in Cremer "Die Wissenschaftlichen Grundlagen der Raumakustik", Band III, S. Herzel Verlag, Leipzig (1950) pp169 et seq especially p.171.

In more detail the method of the present invention employs a thin dense film or sheet of filled ethylene-vinyl acetate copolymer having an average vinyl acetate content in the range of from about 10 to 42 percent by weight and a glass transition temperature of at least 30° Centigrade below average ambient use temperature. An average vinyl acetate content of about 10 to about 42 percent by weight is also required for the film or sheet to be normally self-supporting. By self-supporting is meant that the thin, dense film or sheet can be shaped into a three dimensional form which is retained at temperatures up to 110°C. The advantage of the self-supporting feature is that the thin film or sheet can be formed to a shape which is retained in storage, shipment, and in use as a free standing noise barrier. Moreover, the film or sheet can be preformed into a contour complementary to a substrate to which it is subsequently attached to inhibit transmission of airborne noise through that substrate. The self-supporting feature also allows the film or sheet to be pre-formed to a gien shape which is nestable, and therefore easily packaged and handled. Pre-formed shapes are also an advantage on a high speed assembly line in that they can be easily overlaid the substrate to which they are to be attached, or rapidly melt-bonded or adhesively bonded to that substrate. The thickness of the thin film or sheet used in the airborne noise attenuation method of this invention is usually about 1 millimeter to about 15 millimeters, and preferably from about 1 to about 10 millimeters.

As previously stated the ethylene-vinyl acetate copolymer must have an average vinyl acetate content of 10 to 42 percent by weight and a glass transition temperature of at least minus 20° Centigrade. The latter is necessary so that there will be a difference of at least 30° Centigrade between the average ambient use temperature and the glass transition temperature and consequently good attenuation of airborne noise. In a preferred embodiment at least two different copolymers, one of which contains about 10 to about 17 percent vinyl acetate and the other of which contains about 45 percent vinyl acetate, are used as a blend. Other copolymers with vinyl acetate content between 17 and 40 weight percent (e.g. 24–28 percent and 31–34 percent) may also be included. The copolymer mixtures because of their inhomogeneity give better attenuation of airborne noise than any component alone or a single copolymer having a vinyl acetate content which is the average of the two components.

The filler materials should have an average particle size in the range of less than about 500 microns, preferably less than about 40 microns and most preferably less than 20 microns. The particle size distribution will normally be from about 0.1 microns to about 100 microns. In essence the filler can be any commercial grade of regular ground inorganic solid having a specific gravity of greater than about 2 and preferably greater than about 3. Lower density filler materials may be used in minor proportions. In all cases it is essential that the filler or filler mixture in the amount employed is effective to produce a final film or sheet density greater than about 2.0 grams per cubic centimeter. Very useful filler materials consist of sulfates, carbonates, oxides, sulfides, chlorides, and silicides of barium, calcium, cadmium, arsenic, antimony, sinc, vanadium, iron, tungsten, chromium, cerium, manganese, molybdenum, strontium, sodium or nickel. Preferred fillers include iron oxide (FeO) and lead oxide (Pbo). An especially preferred filler is barium sulfate which has a specific gravity of greater than 4, is easily ground to an average particle size of less than 40 microns, and is easily compounded into the ethylene-vinylacetate copolymer. Other inorganic solids such as carbon black, calcium carbonate and silicas can be added to the copolymer so as to pigment or reinforce the copolymer as desired.

The filler can be compounded into the ethylene-vinyl-acetate copolymer by any known technique. One technique is to mix the filler and copolymer under high shear by mixing in a unit such as a Banbury Mill or a three-roll mill or any other type of high shear mixing unit. A plasticizer such as dioctyl phthalate or dioctyl adipate or the like may be added in an amount of up to 5 percent by weight of the copolymer during compounding.

A phenolic resin such as phenol-aldehyde reaction product resins, and particularly phenol-formaldehyde resins, may also be added to the copolymer. These may be added in an amount of up to about 5 percent by weight of the copolymer. Useful phenolic resins are those designated by the Novolaks, Durez, Resinox and Synvar tradenames.

The filled ethylene-vinylacetate copolymer is thermoplastic and readily formed into films or sheets at temperatures above about 110°C by molding, calendering or extrusion. The films or sheets are easily shaped by vacuum forming or like methods. Another useful shaping technique is the so-called "towel method" wherein the heated film engages by its own weight a surface positioned therebelow. This surface may be a replica of the body panel of an auto or some other device to which the resulting shaped film or sheet is to be applied later on. In other words, this surface functions as a mold form.

Three dimensional shaped articles made from the filled copolymer film or sheet can be stacked in nested groups. Since the product is self-supporting, it will maintain the shape into which it is formed and not flow to another shape. This feature is important since the film or sheet can be preformed and then attached as a free standing part, or heat or adhesively bonded directly to the substrate as desired. A significant use is in sound insulating automobiles.

The products used in the invention are nonflammable (Motor Vehicle Safety Standard (MVSS) 302 and also swing burner test according to Deutsche Industrie Norm (DIN)53 382), and show good chemical stability against water, salt water and dilute acids and lyes. Moreover, the products have high mechanical stability, in particular against breaking and tearing.

The excellent noise inhibiting effects resulting from practice of this invention are especially surprising. The medium sound insulation number R (measured in decibels (dB) where O dB is equal to $2 \times 10^{-4}$ microbar of sound pressure) is according to the Mass Action Law and Berger's Law at vertical sound incidence directly proportional to the logarithm of the wall weight (measured in $kg/m^2$). A view of the theoretical curve shows that a duplication of the wall weight is expected to cause an increase of the sound insulation number by about 6 dB. The sound insulating materials known so far are substantially below this theoretically expected value, at least over a substantial part of the physiologically important range of frequencies of 160 to 10,000 cycles per second. As can be seen from the Figure, a thin, dense plastic film or sheet used in the practice of this invention shows - as compared to the theoretical values — no "break-ins" in the entire physiologically important range of frequencies and considerably surpasses even the theoretically expected insulation values in a wide range of frequencies. The improvement which can be obtained is, moreover, just within the range of frequencies which is especially important in the construction of motor vehicles. In internal combustion engines, in particular in the widely used four-cylinder engines, the second order balancing of masses is solved only approximately with especially disturbing vibrations occurring in the range of from 100 to 300 cycles per second. Materials to be used for insulation of airborne noise in these vehicles must therefore have favorable values in this range of frequencies to improve the sound insulation as compared to simple steel sheet. Another important range of frequencies is that between 800 and 1600 cycles per second, since according to recent scientific publications, sound vibrations in this range are especially annoying and injurious in a physiological and psychological respect. Sound insulation effective in these frequency ranges is provided by the present invention.

The following examples illustrate the practice of the present invention.

EXAMPLE 1

The curve (A) of the FIGURE is based on a series of experiments in which a steel sheet 0.88 millimeters thick and weighing 6.9 kilograms per square meter was coated with a film according to the invention having a thickness of 3 millimeters and a weight of 7.0 kilograms per square meter. The film was composed of 20 percent by weight ethylene/vinyl acetate copolymer(mixture of 3 parts by weight of a copolymer containing 15 percent by weight of vinyl acetate and one part of a copolymer containing 45 percent by weight of vinyl acetate) and 80 percent by weight of fillers (mixture of carbon black, $BaSO_4$, ground slate, mica, asbestos powder).

The sound insulation before and after application of the coating was measured in an APAMAT sound tester (manufactured by Interkeller, Zurich, Switzerland) at various frequencies. The curve shows that the values found are above the improvement to be expected according to Berger's Law up to a frequency value of 1600 cycles per second, and correspond about to the theoretically expected values in the higher range. The O dB level corresponds to the uncoated sheet of steel.

EXAMPLE 2

This example is based on a series of experiments in which a steel sheet 0.88 millimeters thick and weighing 6.9 kilograms per square meter is coated with a film according to the invention having a thickness of 3 millimeters and a weighting 7.7 kilograms per square meter. The film was composed of 19.5 percent by weight of ethylene-vinyl acetate copolymer containing an average of 41.25 percent by weight of vinyl acetate (mixture of 18 parts by weight of copolymer containing 45 percent by weight of vinyl acetate and 1.5 parts by weight of copolymer containing 10 percent by weight of vinyl acetate), 0.5 weight percent of an ethylene-vinyl acetate - acrylic ester terpolymer, and 80 percent by weight of fillers consisting of a mixture of carbon black (0.2 percent) and barium sulfate (79.8 percent). The sound insulation before and after application of the coating is measured in an APAMAT sound tester at various frequencies. The results found are unexpectedly above the improvements to be expected according to the Mass-Action law and Berger's Law through the frequenccy range of 100 cycles per second to 10,000 cycles per second. The following table sets out frequencies and the sound level improvement in decibels over the bare metal.

| Frequency cycles/second | Sound Level Improvement decibels (dB) |
|---|---|
| 100 | 8.0 |
| 200 | 9.0 |
| 400 | 9.6 |
| 600 | 8.5 |
| 800 | 10.0 |
| 1,000 | 10.9 |
| 2,000 | 7.5 |
| 4,000 | 8.0 |
| 6,000 | 8.0 |
| 8,000 | 9.0 |
| 10,000 | 11.0 |

EXAMPLE 3

15 parts by weight of an ethylene-vinyl acetate copolymer containing 15 percent by weight of vinyl acetate, 4 parts by weight of an ethylene-vinyl acetate copolymer containing 28 percent by weight of vinyl acetate, and 1 part by weight of ethylene-vinyl acetate copolymer containing 45 weight percent of vinyl acetate were mixed with 79.6 parts by weight of barium sulphate and 0.4 parts by weight of finely divided carbon black. A sheet 2.2 millimeters thick was obtained by calendering. This sheet was applied to a metal sheet 0.8 millimeters thick. At a weight of 5 kilograms per square meter the sound blocking material gave an average sound level improvement of 5.2 to 5.5 dB.

EXAMPLE 4

Example 3 was repeated except that 14 parts by weight of of a copolymer containing 12 percent by weight of vinyl acetate, 2 parts by weight of a copolymer containing 45 percent by weight of vinyl acetate and 4 parts by weight of a copolymer containing 31 percent by weight of vinyl acetate were admixed with the filler composition. From this mixture sheets 1.5 millimeters thick were made by an extrusion process. When applied to metal sheets 0.6 millimeters thick the extruded polymeric sheets resulted in an average improvement of the sound level of 4.5 to 4.8 dB. The weight of the sound blocking material was about 3.5 kilograms per square meter.

EXAMPLES 5–6 AND COMPARATIVE EXAMPLES A–F

These examples show comparisons of characteristics and properties of filled films prepared from ethylene-vinyl acetate copolymers having varying vinyl acetate contents and from varying types of fillers. Each of the sample films had a thickness of 4.0 millimeters. The films were produced by shear mixing the filler into the respective ethylene-vinyl acetate copolymer ingredients and calendering the mixtures. Results of the tests are shown in the following Table 1.

In Table 1, the specific gravity is that of the respective test films. The coincidence frequency is the frequency at which airborne sound will pass through the film without any appreciable loss. As the frequency of the incident airborne sound approaches the coincidence frequency more sound passes through the film until it reaches a maximum at the coincidence frequency. When the coincidence frequency is close to, or within, the audible range of frequencies, i.e., below about 12 kilocycles per second, there will be a decreased airborne sound damping effectiveness. It is required for good airborne noise inhibition that the coincidence frequency be outside of the human audible range. Table 1 sets out the coincidence frequency at 0° Centigrade and −20° Centigrade for the same thickness of film and for films of the same density. It is evident from this Table that only the films of this invention (Examples 5 and 6) have coincidence frequencies above the audible range.

The films were also tested for their physical characteristics. As seen in Table 1, the films used in the practice of this invention (Examples 5 and 6) are the only films which have both good low and high temperature properties. They have good thermal stability up to 100° Centigrade, bend without breaking at 0° Centigrade and can be thermoformed at 180° Centigrade without tearing.

In Examples 5 the ethylene-vinyl acetate copolymer binder was a blend of the two copolymers described in Example 1 and in Example 6 the binder was a blend of the three copolymers described in Example 2. In comparative Examples A–F the ethylene-vinyl acetate copolymer binders were commercially available products having the respective vinyl acetate contents shown in Table 1. These are representative of the copolymers suggested in Example 1 of BASF British Pat. No. 884,573 as suitable binders for anti-drumming compositions. (i.e., for inhibiting generation of structure-borne noise).

Table 1

| Example | Weight percent vinyl acetate in copolymer binder | Glass transition temperature of binder (in ° centigrade) | Type of filler | Weight percent filler | Specific gravity (grams per cubic centimeter) |
|---|---|---|---|---|---|
| 5 | 24 | −40 | BaSO₄ | 80 | 2.25 |
| 6 | 40 | −40 | BaSO₄ | 80 | 2.4 |
| A | 70 | 15 to −20 | BaSO₄ | 80 | 2.45 |
| B | 75–90 | − 5 to 0 | BaSO₄ | 80 | 2.45 |
| C | 85 | − 5 to 0 | Vermiculite | 30 | 1.25 |
| D | 85 | − 5 to 0 | Vermiculite | 60 | 1.6 |
| E | 75–90 | − 5 to 0 | Vermiculite | 30 | 1.2 |
| F | 75–90 | − 5 to 0 | Vermiculite | 60 | 1.55 |

| Example | Coincidence Frequency (kilocycles per second) at 4 millimeters thickness | | at film weight of 10 kilograms per square meter | |
|---|---|---|---|---|
| | −20° Centigrade | 0° Centigrade | −20° Centigrade | 0° Centigrade |
| 5 | 13.9 | 23 | 12.5 | 22 |
| 6 | 15.1 | 20 | 14.5 | 20 |
| A | 8.5 | 10.6 | 8.9 | 10.1 |
| B | 6.7 | 7.6 | 6.7 | 7.6 |
| C | 7.0 | 8.7 | 3.4 | 4.4 |
| D | 5.0 | 5.1 | 3.2 | 3.7 |
| E | 6.1 | 7.1 | 2.9 | 3.4 |
| F | 4.4 | 5.0 | 2.7 | 3.1 |

| Example | Bending test at 0° Centigrade over mandrel of 20 millimeters diameter | Thermal stability: sheets of 100 × 50 millimeters with a hole 10 millimeters from the edge suspended vertically | Formability test: material formed over a bead of 30° at 180° Centigrade |
|---|---|---|---|
| 5 | good | no failure up to 100°C | easily formable |
| 6 | good | no failure up to 100°C | easily formable |
| A | — | no failure up to 40°C | formable |
| B | — | no failure up to 40°C | formable |
| C | breaks | no failure up to 100°C | breaks |
| D | breaks | no failure up to 100°C | breaks |
| E | breaks | no failure up to 70°C | formable |
| F | breaks | no failure up to 100°C | breaks |

Due to their special chemical and physical properties, the products used in the present invention are especially suitable for use in automobiles and other motor vehicles. For a lining of the motor and trunk cases, their good temperature stability, in particular the dimensional stability in the range of about −40° to about + 110° Centigrade, as well as their chemical resistance in addition to their excellent sound insulating properties are important. A further improvement of the chemical properties can be obtained e.g., by coating the outer surface of the heavy plastic film with a thin polyamide or other film or spraying it with a polyamide or other resin having a thickness of from 10–100 microns. The sound blocking product may also be coated with a foam or other soft, flexible open celled material where cushioning or special sound insulating effects are desired. Regarding the benefits to the user, it is of particular importance that the noise insulating material is available in an already pre-manufactured and/or punched form and can easily be pasted or melted at temperatures of 110° to 200° Centigrade onto bare or primed (lacquered) steel sheet. This is possible for the first time by the fact that the material is selfsupporting and dimensionally stable and shows no tendency to flow even at high temperatures. When applied to a supporting sheet, at up to temperatures of 100° Centigrade in either a vertical or overhead position, it exhibits no tendency to flow and lose its shape.

Further, when practising the invention in the interior of motorcars, it is not only possible to attain a good sound insulation by coating the front wall of the passenger compartment or the trunk case wall or bottom, but also by providing a preformed tray to be fixed below the dashboard board, dashboard sections, a shell to be mounted on the tunnel or coverings for the gear-shift lever, fender well sections, and so on. It is also possible to treat the surface of the dense plastic film by coating it with textiles, fiber flocks, plastic films or foamed plastic films, woven or non-woven fabrics, or spraying it with resins, preferably polyamides, to achieve special surface characteristics. The surface coating may be coloured and/or embossed or grained. Thus, it is possible to achieve any desired physical surface characteristics, as well as a certain appearance corresponding to the other outfit of the car interior.

In summary, the uses are innumerable. The method of this invention is useful in aircraft, in home appliances and in high fidelity sound systems. Further uses will be evident to those skilled in the art.

What is claimed is:

1. Method for inhibiting transmission of airborne noise which comprises interposing in the air space between the noise source and the location to be insulated a thin, dense, film composed essentially of about 10 to about 40 weight percent ethylene-vinyl acetate copolymer having an average vinyl acetate content of from about 10 to about 42 percent by weight and a glass transition temperature of at least about 30° Centigrade below the average ambient temperature in the said air space and from about 60 to about 90 percent by weight of inorganic filler materials effective to produce a film or sheet density greater than about 2 grams per cubic centimeter, said film further being able to be shaped into a three dimensional form which is retained in storage, shipment and in use as an inhibitor of transmission of said airborne noise in said air space.

2. Method as defined in claim 1 wherein said inorganic filler materials consist principally of barium sulfate.

3. Method as defined in claim 1 wherein said film has a thickness of about 1 millimeter to about 15 millimeters.

4. Method as defined in claim 1 wherein said ethylene-vinyl acetate copolymer is a mixture of at least two ethylene-vinyl acetate copolymers, one containing about 10 to about 17 percent by weight vinyl acetate and at least one other containing about 45 percent by weight vinyl acetate.

5. Method as defined in claim 1 wherein the interposed film or sheet is pre-formed to a complementary shape and then bonded directly to the surface of a non insulatinng three dimensional substrate already present in the said air space.

6. Method as defined in claim 5 wherein said substrate is an auto engine compartment firewall.

7. Method as defined in claim 5 wherein said substrate is an auto dashboard.

* * * * *